H. W. Caswell,
Earth Auger,
N° 63,016. Patented Mar. 19, 1867.
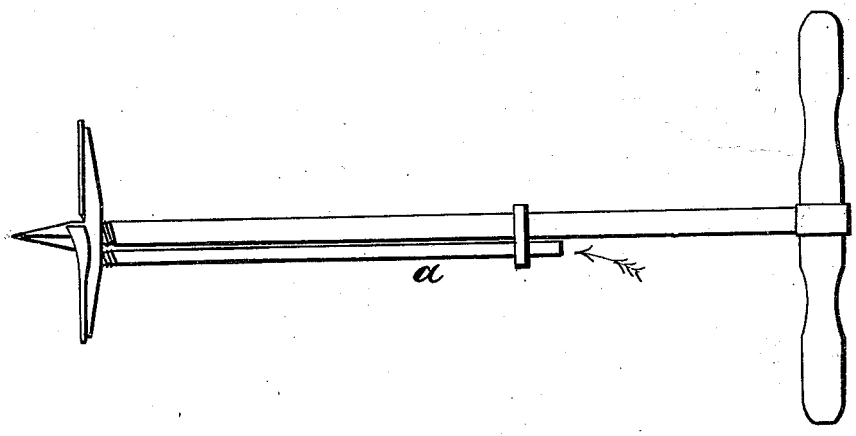
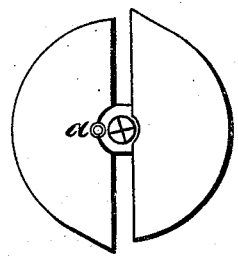
Witnesses
Inventor
H W Caswell

United States Patent Office.

HENRY W. CASWELL, OF YARMOUTH, MAINE.

Letters Patent No. 63,016, dated March 19, 1867.

---

IMPROVEMENT IN POST AUGERS.

---

The Schedule referred to in these Letters Patent and making part of the same.

---

TO ALL WHOM IT MAY CONCERN:

Be it known that I, HENRY W. CASWELL, of Yarmouth, in the county of Cumberland, and State of Maine, have invented a new and useful Improved Post Auger; and I hereby declare the following to be a full, clear, and exact description of the same, which will enable others to make and use my invention, reference being had to the accompanying drawings, forming part of this specification, in which—

Figure 1 is a side view.

Figure 2, a bottom view.

My invention is connected with an implement used to bore holes in the earth for the insertion of posts, in the construction of fences, and for other purposes. Different styles of boring apparatus are used for these purposes, but my invention has no relation to the boring devices themselves, being applicable, however, to them all. In all of these borers, when the user has penetrated the earth to the depth of a few inches, it becomes necessary to withdraw the auger in order to relieve it of the accumulation of soil upon it. In close, compact soils, or where there is clay, and particularly where the soil is moist or saturated with water, this is a matter requiring a considerable exertion of strength. If the earth is quite wet, and the auger has penetrated six, eight, or ten inches, it will need more than the ordinary strength of a man, when exerted in such manner and direction as it must under the circumstances be, to withdraw the borer from the hole. Frequent retractions of the tool thus become necessary, and, with any degree of penetration into the ground, they are fatiguing. The purpose of my invention is to relieve the implement of this difficulty attendant upon its use under such circumstances. It will be readily seen that the cause of the auger thus being        into the hole it has made, is owing to the external pressure of the atmosphere upon the wet or compact soil above, which prevents the admission of air beneath the auger, so that, when raised, the user lifts not only the soil, but has also to overcome the resistance of the air, operating against him by reason of the vacuum underneath the auger. I obviate this difficulty by attaching to the auger an air-tube leading from above the mouth of the hole to its bottom, thus freely admitting air underneath the soil upon the top of the borer, and relieving the user of so much weight which he would otherwise have to lift at every withdrawal.

An example of a post auger now in use is shown in the drawing, having attached to the shaft thereof the air-tube $a$. The lower aperture of the air-tube is seen at $a$, fig. 2. I desire further to specify that my invention contemplates another form of the application of this principle, viz, by making the shaft of the auger itself hollow, with an aperture at or near its lower end, and an upper opening at or near the upper end of the shaft, at any convenient point. When the supplemental tube $a$ is used—as illustrated in the drawing—it may be attached to the shaft by rings, or in any convenient manner.

What I claim as my invention, and desire to secure by Letters Patent, is—

Combining with a post auger an air-tube, substantially as and for the purposes specified.

H. W. CASWELL.

Witnesses:
WILLIAM HENRY CLIFFORD,
EDWARD P. FURLONG.